United States Patent
Harris

(10) Patent No.: US 11,258,849 B2
(45) Date of Patent: Feb. 22, 2022

(54) CONGESTION NOTIFICATION TO A NODE NOT YET JOINED TO A NETWORK, RESULTING IN A DYNAMIC JOIN TIME

(71) Applicant: Landis+Gyr Innovations, Inc., Alpharetta, GA (US)

(72) Inventor: Lawrence S. Harris, Duluth, GA (US)

(73) Assignee: Landis+Gyr Innovations, Inc., Alpharetta, GA (US)

( * ) Notice: Subject to any disclaimer, the term of this patent is extended or adjusted under 35 U.S.C. 154(b) by 73 days.

(21) Appl. No.: 16/655,908

(22) Filed: Oct. 17, 2019

(65) Prior Publication Data
US 2021/0120082 A1  Apr. 22, 2021

(51) Int. Cl.
| H04W 48/10 | (2009.01) |
| H04L 67/1042 | (2022.01) |
| H04W 76/10 | (2018.01) |
| H04W 56/00 | (2009.01) |
| H04W 84/18 | (2009.01) |

(52) U.S. Cl.
CPC ......... *H04L 67/1046* (2013.01); *H04W 48/10* (2013.01); *H04W 56/001* (2013.01); *H04W 76/10* (2018.02); H04W 84/18 (2013.01)

(58) Field of Classification Search
CPC ....................................................... H04L 12/28
USPC ......................................................... 370/300
See application file for complete search history.

(56) References Cited

U.S. PATENT DOCUMENTS

| 9,736,726 B2 | 8/2017 | Shudark et al. |
| 2007/0124443 A1 | 5/2007 | Nanda et al. |
| 2010/0034091 A1 | 2/2010 | Hiertz et al. |
| 2010/0146117 A1 | 6/2010 | Hoeksel |
| 2012/0155276 A1 | 6/2012 | Vasseur et al. |
| 2014/0222725 A1* | 8/2014 | Vasseur ................... G06N 20/00 706/12 |
| 2020/0288558 A1* | 9/2020 | Anderson ............... H04W 4/50 |

OTHER PUBLICATIONS

International Patent Application No. PCT/US2020/055628, International Search Report and Written Opinion, dated Jan. 25, 2021, 17 pages.

* cited by examiner

*Primary Examiner* — Dang T Ton
(74) *Attorney, Agent, or Firm* — Kilpatrick Townsend & Stockton LLP

(57) ABSTRACT

A method includes a joining node, not yet joined to a network, listening to a second node that is joined to the network. The joining node may determine a join time at which to request to join the network. The joining node may receive from the second node a beacon indicating time synchronization of the network and further including a first congestion variable indicating a level of congestion of the network. The joining node may adjust the join time based on the first congestion variable in the beacon. At the join time, the joining node may transmit an association request to join the network.

20 Claims, 4 Drawing Sheets

CONGESTION NOTIFICATION TO A NODE NOT YET JOINED TO A NETWORK, RESULTING IN A DYNAMIC JOIN TIME

TECHNICAL FIELD

Various implementations of the present invention relate to network communications and, more particularly, to congestion notification to a node not yet joined to a network, resulting in a dynamic join time for the node.

BACKGROUND

Utility meters typically participate in a mesh network, in which various nodes communicate with one another by way of radio-frequency (RF) radio. From time to time, a utility meter or other type of node may need to join the network, so as to participate in communications among various nodes in the network. This can occur in the case where the network is being formed, in which case many nodes are attempting to join the network, or this occur when a node is newly commissioned or has been offline.

Joining a network typically requires a sequence of messages to be communicated between a joining node that is not yet a member of the network and a potential parent node that is already a member of the network. For instance, the joining node communicates an association request to the potential parent node, and the potential parent node communicates an acknowledgement back to the joining node. The joining node and the potential parent node may then exchange additional messages to ensure that the joining node is properly joined to the network.

In some cases, the network may have low bandwidth but may still be required to support a large number of devices. The process of joining a node to a network can fail if a message that is part of the joining process is dropped, which is more likely to occur if the network is congested. To reduce such failures, each node utilizes a randomized join time, to prevent multiple nodes from attempting to join a network simultaneously. Further, if a node experiences a failure in joining the network, that node will wait for a period before making another attempt at a randomized time. For each successive failure, the waiting period grows exponentially, so in the case of multiple failures across multiple nodes attempting to join, the requests to join are spaced out farther and farther for each failure.

SUMMARY

In one implementation, a method includes a joining node, not yet joined to a network, listening to a second node that is joined to the network. The joining node determines a join time at which to request to join the network. The joining node receives from the second node a beacon indicating time synchronization of the network and further including a first congestion variable indicating a level of congestion of the network. The joining node adjusts the join time based on the first congestion variable in the beacon. At the join time, the joining node transmits an association request to join the network.

In another implementation, a joining node attempting to join a network includes a processor and a memory. The processor is configured to execute computer-readable instructions, and the memory is configured to store the computer-readable instructions that, when executed by the processor, cause the processor to perform operations. The operations include listening to a second node joined to the network and determining a join time at which to request to join the network. The operations further include receiving from the second node a beacon indicating time synchronization of the network and including a first congestion variable indicating that congestion exists in the network. The operations further include increasing the join time based on the first congestion variable in the beacon and, at the join time, transmitting to the second node an association request to join the network.

In yet another implementation, a joined node that is a member of a network includes a processor and a memory. The processor is configured to execute computer-readable instructions, and the memory is configured to store the computer-readable instructions that, when executed by the processor, cause the processor to perform operations. The operations include listening to a parent node in the network, where the joined node and the parent node are both members of the network. The operations further include receiving from the parent node a beacon indicating time synchronization of the network and further including a congestion variable indicating no congestion in the network. The operations further include determining that a message queue meets a threshold quantity of outgoing messages and, based on the message queue meeting the threshold quantity of outgoing messages, updating the congestion variable in the beacon to indicate that congestion exists in the network. The operations further include transmitting the beacon with the updated congestion variable to one or more other nodes listening to the joined node.

These illustrative aspects and features are mentioned not to limit or define the presently described subject matter, but to provide examples to aid understanding of the concepts described in this application. Other aspects, advantages, and features of the presently described subject matter will become apparent after review of the entire application.

BRIEF DESCRIPTION OF THE FIGURES

These and other features, aspects, and advantages of the present disclosure are better understood when the following Detailed Description is read with reference to the accompanying drawings.

DETAILED DESCRIPTION

Lossy networks are likely to experience a high packet-drop rate, which slows network formation. Further, when a node attempts to join a network and fails due to one or more dropped packets in the joining process, that join process may need to be restarted, which means packets may need to be re-sent. With a congested network, a node may retry joining multiple times. Filling the network with requests that are likely to fail wastes bandwidth and leads to further congestion. Although the existing art is able to manage congestion in a reactive manner in some cases, there is currently no mechanism for recognizing congestion proactively to avoid failures when attempting to join nodes, so as to avoid exacerbating congestion, and there is currently no mechanism for recognizing that a period of congestion has ended and that nodes need no longer maintain long wait time before attempting to join. Current strategies of postponing joins based on failures lead to slow and inefficient network formation for networks that have experienced congestion-induced failures during join processes. Such strategies do not react well to dynamic network conditions.

Some implementations of the invention address these drawbacks by establishing a mechanism to indicate, or advertise, network congestion to nodes not yet joined to the network and further by enabling a joining node to establish a dynamic join time, which can be pushed forward or backward based on the indication of network congestion. Implementations of the invention include in a beacon, which is typically used for time synchronization and is sent by way of the data link layer of communication, a congestion variable that indicates a level of congestion. A joining node (i.e., a node not yet joined to the network but seeking to join) may receive the beacon by listening to a joined node (i.e., a node that is joined to the network) that is potentially a parent node for the joining node. The joining node determines a randomized join time within an initial join window. Based on the congestion variable, the join window may lengthen or shorten, and the join time adjusts accordingly. When the adjusted join time arrives, the joining node may transmit a request to join the network to its potential parent.

Due to the dynamic nature of the join window maintained by each node seeking to join the network, requests to join the network are spaced appropriately for current conditions in the network. This can be especially useful during network formation, when many nodes are seeking to join, which can lead to congestion. By delaying join requests in response to congestion, implementations of the invention increase the probability that the network will form quickly. When conditions improve after having been congested, the join window of a joining node shortens, thus avoiding the existing drawback of indefinitely spacing out requests to join.

Figure 1:
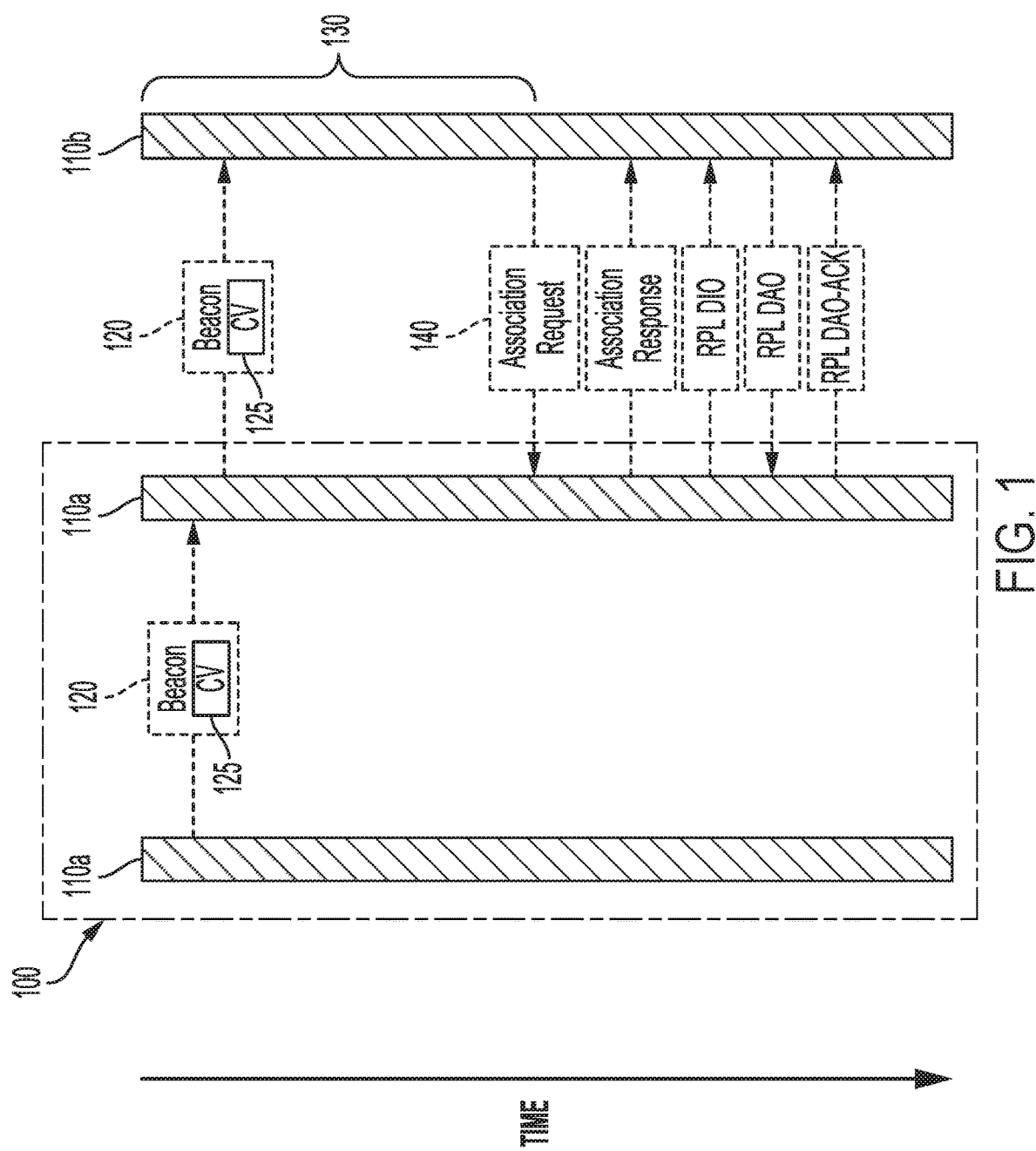
FIG. 1 is a block diagram of an association sequence for joining a network, according to some implementations of the invention.

FIG. 1 is a block diagram of an association sequence for joining a network 100, according to some implementations of the invention. As shown in FIG. 1, the association sequence (i.e., the sequence for joining a node to the network 100) involves one or more nodes 110, including a node 110a that is already a member of the network 100, also referred to as a joined node 110a, and a node 110b that is not yet a member of the network 100. Herein, a node 110b that is not yet a member of the network 100 but is attempting to join the network 100 is also referred to as a joining node 110b. The joined node 110a may have as its parent another joined node 110a, which is also a member of the network 100.

Conventionally, a beacon is passed throughout the network 100 from time to time, originating at a root node of the network and being transmitting throughout the network from parent to child. The beacon provides information related time synchronization. For instance, the network may be a mesh network with communications occurring through RF radio, and the beacon may indicate which radio channels to use at which times, thus enabling the various nodes to maintain communication. Typically, a beacon is transmitted over the data link layer, specifically, over the Medium Access Control (MAC) sublayer of the data link layer.

The data link layer, which is a protocol layer of a communication architecture, handles data movement into and out of a physical link in a network. The data link layer is the second layer in the Open Systems Interconnection (OSI) architecture model for telecommunication protocols. Bits of data are encoded or decoded as needed and are organized in the data link layer before being transported between directly connected nodes. From lowest to highest, the layers in the OSI model are as follows: physical layer, data link layer, network layer, transport layer, session layer, presentation layer, and application layer. A layer serves the layer above and is served by the layer below. The network layer is responsible for packet forwarding, including routing through intermediate nodes. The Explicit Congestion Notification (ECN) feature in the Internet Protocol (IP) is typically used to indicate congestion within a network, but this feature exists to regulate the network layer and is therefore not available in the lower data link layer. The ECN feature is available only for nodes joined to an established network, when the IP protocol is applicable. During network formation or when a node is not yet part of a network, however, the IP protocol is not used and ECN is not available.

This disclosure utilizes the term "beacon" as a general term. It will be understood by one skilled in the art that this term is used to refer to a message in the data link layer, regardless of what such a message is typically called. For example, and not by way of limitation, a "beacon" discussed herein may refer to a beacon in the IEEE 802.15.4 protocol or a Pan Advertisement message in the Wi-SUN protocol. An implementation of the invention adds information about congestion to such a message as described herein.

Each joined node 110a may transmit a beacon 120 to downstream nodes 110, which are nodes 110 listening to the joined node 110a. Such downstream nodes 110 include, for example, one or more child nodes 110a already joined to the network 100, one or more potential child nodes 110b not yet joined to the network 100, or a combination of both. Generally, the beacon 120 is passed down to nodes 110 in a tree formation, with each joined node 110a passing the beacon 120 to its child nodes 110a as well as other nodes 110 (e.g., a joining node 110b) that might be listening.

In some implementations, the beacon 120 includes a congestion variable 125 written into the beacon 120. For instance, the congestion variable 125 may be written into a header or information element (IE) of the beacon 120. In one example, the congestion variable 125 may be represented by a single bit, which may reside in the header, where that bit is used as a Boolean variable indicating whether congestion exists. In that case, for instance, a value of one indicates that congestion exist in the network 100 (i.e., the network 100 is congested), and a value of zero indicates that the network 100 lacks congestion (i.e., the network 100 is not congested). In another example, the congestion variable 125 may be represented by two bits, such as two bits analogous to the two least-significant bits of an IP header's differentiated services (DiffServ) variable, where such two bits may reside in an IE incorporated into the beacon header and may function similarly to the least-significant DiffServ bits. Upon detecting congestion, as will be described in more detail below, an example node 110 in the network 100 updates the beacon 120 received by updating the congestion variable 125 to indicate the existence of congestion. In other words, for instance, the example node 110 flips the bit representing the congestion variable 125 from zero to one or sets the congestion variable 125 to some other value known to indicate that congestion exists. The example node 110 transmits this updated version of the beacon 120 to nodes 110 that are listening, specifically child nodes 110a of the network 100 and potential child nodes 110b that have not yet joined the network. In some implementations, each child node 110a in the network 100 passes this updated beacon 120 to its own child nodes 110a in due course, and thus, the indication of congestion is propagated throughout the downstream nodes 110 of the network 100.

In some implementations, a joined node 110a is restricted from changing the congestion variable 125 from indicating existing congestion to indicating a lack of congestion. Allowing such a change would essentially enable a node 110 to remove an indication of congestion provided by an upstream node 110. Rather, when the next beacon 120 passes through the network 100, the congestion variable 125 in that next beacon 120 may or may not be updated to indicate that congestion exists, and thus, the changing condition of the network's congestion state is recorded in the beacons 120.

A joining node 110b that is not yet joined to the network 100 may select a joined node 110a to use as a potential parent node 110. Various mechanisms exist for determining which node 110 to select as a potential parent node 110, and the joining node 110b may utilize one or more of such mechanisms. For example, and not by way of limitation, the joining node 110b may select the joined node 110a from which the joining node 110b gets the strongest signal. The joining node 110b may listen to the selected joined node 110a for beacons 120. As described above, the node 110 may determine a randomized join time 130, which may be a specific point in time randomly selected from a default join window that begins, for example, from when the joining node 110b decides to join the network 100 and spans a time length that is predetermined. However, in some implementations, the join window and the selected join time 130 are dynamic. As described in more detail below, based on the congestion variable 125 of each beacon 120 or the passage of time since a congestion variable 125 last changed, the join time 130 may increase or decrease, implicitly causing the join window to lengthen or shorten respectively.

When the join time 130 arrives, the joining node may transmit an association request 140 to the joined node 110a selected as the potential parent. As shown in FIG. 1, in one example, several messages are exchanged to complete the joining process after the association request 140. In this example, the joined node 110a sends an association response and a Routing Protocol for Low Power and Lossy Networks (RPL) DODAG Information Object (DIO), which carries information enabling the joining node 110b to discover the RPL instance in use and to learn the requisite parameters for routing data in the network 100. The joining node 110b transmits to the joined node 110a a RPL Destination Advertisement Object (DAO), which describes the relationship between the joining node 110b and its parent and, if applicable, backup parent. This information is passed upstream to a collector, such as a root node, enabling the collector to aggregate parentage information about the various nodes 110 in the network 100 to determine how to route messages through the network 100. In reply, the joined node 110a transmits to the first node 110 a RPL DAO-ACK, which is an acknowledgement of the RPL DAO. In this example, the joining node 110b is joined to the network 100 as a result of the exchange of such messages. It will be understood, however, that the messages required to join a node 110 to the network 100 responsive to the association request 140 may vary.

Although only a single joining node 110b is shown in FIG. 1, it will be understood that various nodes 110 may seek to join the network 100 at a given time. Each such node 110 may identify a potential parent node 110 and may perform the operations described herein to select a join time 130, adjust the join time 130 as needed, and send an association request 140 to join the network 100. Additionally, although only two joining nodes 110a are shown as members of the network 100 in FIG. 1, it will be understood that the network 100 may include a plurality of nodes 110, which may propagate a beacon 120 as described herein. In some implementations, the joining nodes 110a shown in FIG. 1 culminate a series of nodes 110 in the network 100, each acting as a parent and thus passing a beacon 120 to its child nodes 110a. When seeking to join the network 100, a joining node 110b may select a node 110, of the plurality of nodes 110, as a potential parent node 110 in the network 100.

Figure 2:
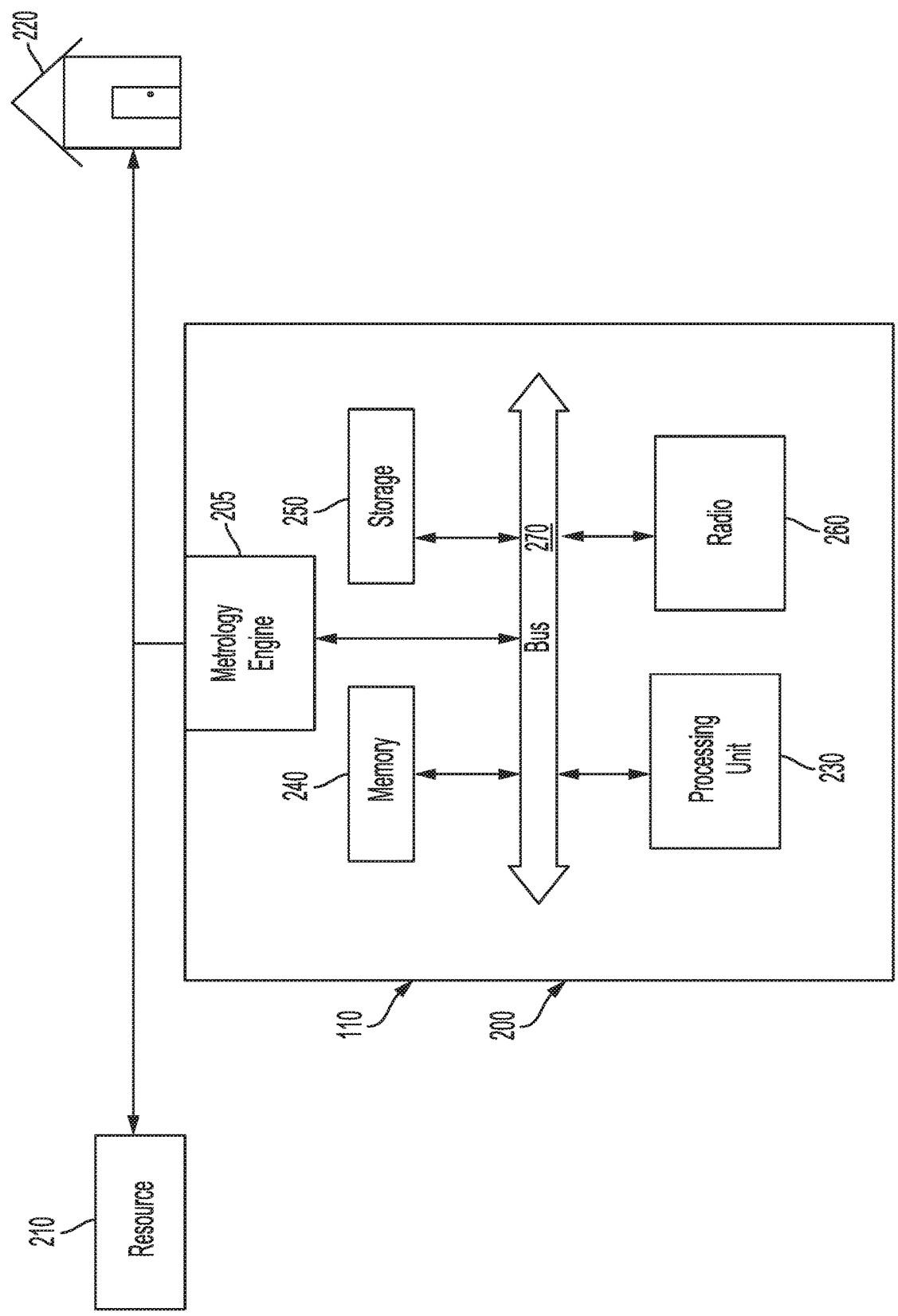
FIG. 2 is a block diagram of a utility meter acting as a node in the association sequence, according to some implementations of the invention.

FIG. 2 is an architectural diagram of a node 110, specifically a utility meter 200, according to some implementations of the invention. For example, and not by way of limitation, the utility meter 200 may be a water meter, a gas meter, or another type of meter that measures consumption of a resource 210. This example utility meter 200 or others may act as a joined node 110a configured to write to and propagate a beacon 120 to indicate congestion, or this example utility meter 200 or others may act as a joining node 110b listening to a beacon 120 that incorporates a congestion variable 125 as described herein.

As shown in FIG. 2, the utility meter 200 measures consumption of a resource 210 occurring on a premises 220. To this end, the utility meter 200 may include a metrology engine 205, which detects a signal indicating use of the resource 210 and, based on that signal, determines use of the resource 210 on the premises 220. The utility meter 200 may further include a processing unit 230, a memory 240, a storage 250, and a communication device such as a radio 260, which may be in communication with one another and with the metrology engine 205 by way of a bus 270. For example, and not by way of limitation, the memory 240 may be random-access memory (RAM), and the storage 250 may be flash storage or read-only memory (ROM). Although the processing unit 230, the memory 240, and the storage 250 are shown and described herein as being distinct components, it will be understood that this distinction is for illustrative purposes only. For instance, the processing unit 230, the memory 240, and the storage 250 may be integrated together into a single chip, such as a microcontroller unit.

In some implementations, the operations of a node 110 described herein, such as writing a value to a congestion variable 125 in a beacon 120 or reading the value of the congestion variable 125 from the beacon 120, are embodied as program instructions stored in a computer-readable medium, such as the storage 250 or the memory 240. In some implementations, the computer-readable medium is a non-transitory computer-readable medium. The processing unit 230 may execute the program instructions to implement the invention as described herein. The radio 260 or other communication device may receive a beacon 120 having a congestion variable 125 as described herein, or may transmit such a beacon 120 as described herein.

Although this disclosure refers repeatedly to implementations of the invention being embodied in a utility meter 200, it will be understood by one skilled in the art that implementations described herein are not limited to utility meters 200. Rather, for instance, a node 110 may be a collector, a gateway, or another computing device other than a utility meter 200.

Figure 3:
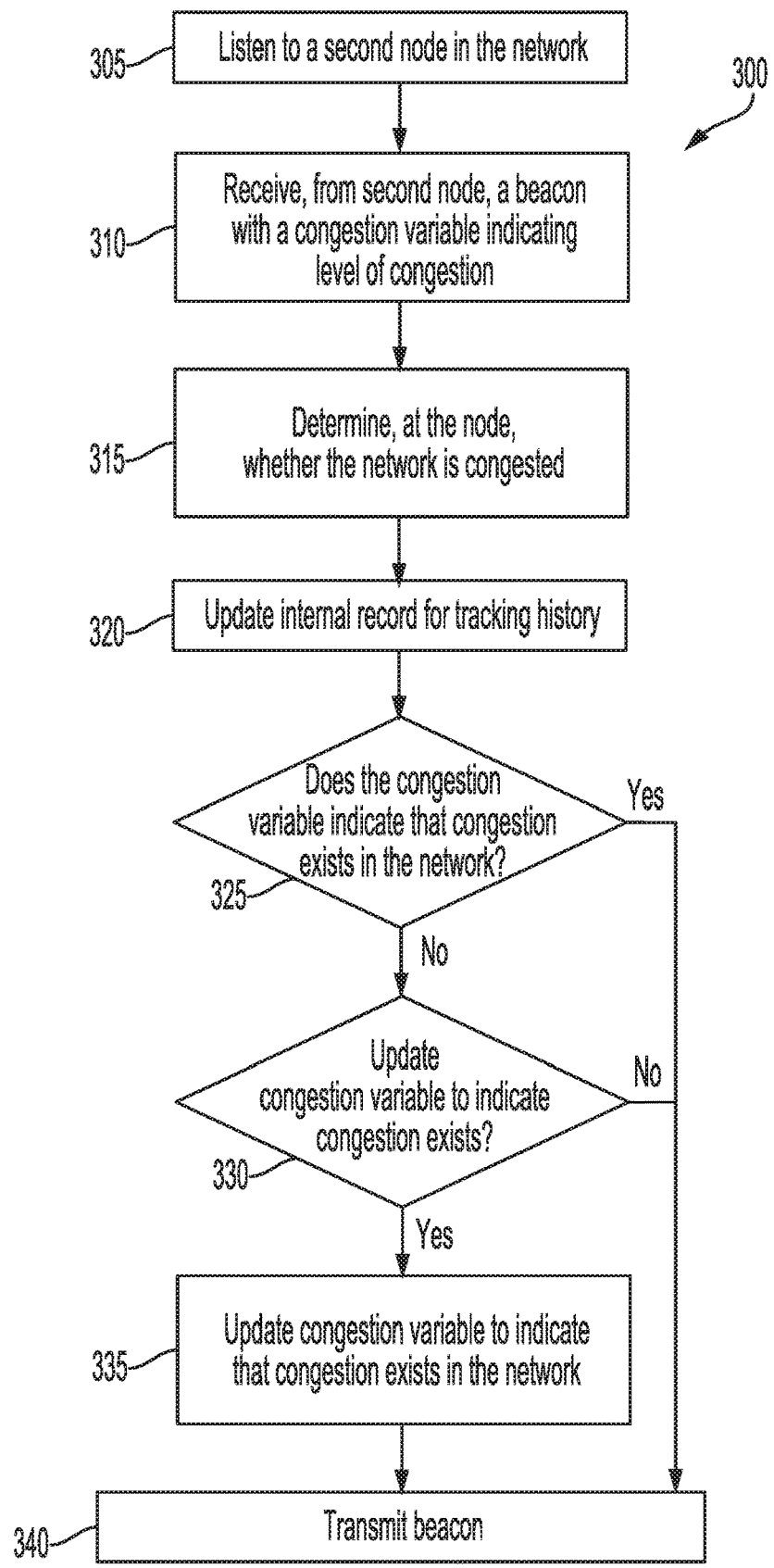
FIG. 3 is a flow diagram of a method of indicating congestion in a beacon of the network, according to some implementations of the invention.

FIG. 3 is a flow diagram of a method 300 of indicating congestion in a beacon 120 of the network 100, according to some implementations of the invention. Using this method 300 or similar, an example node 110 in the network 100 advertises congestion to downstream nodes 110, including child nodes 110a in the network 100 or potential child nodes 110b not yet joined to the network 100, by way of updating a congestion variable 125 in a beacon 120. In turn, each downstream node 110 in the network 100 passes along this advertisement. As a result, downstream nodes 110 can opt to postpone non-critical traffic until the congestion has cleared, and joining nodes 110b can update their respective join times 130 to reduce further network congestion.

As shown in FIG. 3, at block 305, a node 110a in the network 100 listens to a parent node 110a also joined to the network 100, as is typically the case. At block 310, the node 110a receives a beacon 120 from the parent node 110a, where the beacon includes a congestion variable 125 according to some implementations of the invention described herein. For instance, the congestion variable 125 may be a bit in a header of the beacon 120.

In some implementations, if the congestion variable 125 in the received beacon 120 already indicates the existence of congestion, the node 110a does not change this indication but, rather, passes along the advertisement that congestion exists upstream of the node 110a. In some implementations, the node 110a is restricted from changing the congestion variable 125 from indicating existing congestion to indicating a lack of congestion. Allowing such a change would essentially enable a node 110a to remove an indication of congestion provided by an upstream node 110a. However, in some implementations, regardless of the value of the congestion variable 125, the node 110a may determine for itself whether the network 100 is congested. Even if the congestion variable 125 already indicates the existence of congestion, the node 110a may maintain a record of whether the node 110a itself found congestion in the past and for how long the current state of congestion (e.g., congested or not) existed as per the node's own determination. This record may be used to determine whether to indicate congestion later, as described below, so as to avoid quick swings in indications of congestion.

At block 315, the node 110a makes its own determination as to whether the network 100 is congested. More specifically, the node 110a determines whether the network 100 is congested based on a local picture visible to the node 110a. For example, and not by way of limitation, the node 110a may base its determination of congestion on its own message queue, which is a queue maintaining outgoing messages to be transmitted by the node 110a. In some implementations, if the message queue includes a quantity of outgoing messages meeting (e.g., equal to or exceeding) a threshold quantity, then the node 110a may deem the network 100 to be congested. However, if the message queue has a quantity of messages not meeting the threshold quantity, then the node 110a may decide that the network 100 is not congested. For another example, the node 110a may base its determination of congestion on packet success rate, for instance, the success rate of packets the node 110a itself sends. If the packet success rate falls below a threshold rate, the node 110a may deem the network 100 to be congested, and if the packet success rate meets or exceeds such threshold rate, then the node 110a may deem the network 100 not to be congested. It will be understood that various other techniques may be used by the node 110a to determine whether congestion exists.

At block 320, the node 110a updates its internal record used to track the history of its own determinations of congestion. For instance, such record may include a state variable and a timer variable. The state variable may indicate the previous determination of the congestion state made by the node 110a, which is, for instance, the determination of the congestion state made upon receipt of a previous beacon 120. The timer variable may be a running time that keeps track of how long it has been since the congestion state changed in the node's own determination (e.g., how long the node 110a has deemed the network 100 to be congestion or not congested). Thus, if the current congestion state differs from that indicated in the state variable, then the node 110a may reset the timer variable to zero, and the state variable may be set to indicate the current state of congestion as determined locally by the node 110a. However, if the current congestion state is the same as that indicated by the state variable, then the state variable may remain unchanged, and the timer variable may continue to run without being reset.

Some implementations of node 110a base the determination of whether to indicate congestion (i.e., whether to update the congestion variable 125) on this record and, more specifically, on the prior determination of the congestion state as well as how long that congestion state has been maintained. It will be understood that, although this internal record may be useful in avoiding quick swings between differing indications of congestion made by the node 110a, certain implementations do not maintain such a record. In the absence of such a record, the node 110a may simply update the congestion variable 125 to indicate the existence of congestion each time the node 110a identifies congestion in the network, regardless of historical congestion states.

At decision block 325, the node 110a determines whether the congestion variable 125 in the received beacon 120 already indicates the existence of congestion. If so, then the method 300 proceeds to block 340, skipping the operations of determining whether to update the congestion variable. As discussed above, some implementations of the node 110a do not change the congestion variable 125 if it already indicates that congestion exists but, rather, simply pass the indication forward.

However, if the congestion variable does not indicate the existence of congestion, then at decision block 330, the node 110a determines whether to update the congestion variable 125 in the beacon 120 to indicate the existence of congestion. Similarly, if block 310 has not occurred such that the node 110a has not received a beacon 120 from a parent node 110a but, rather, is generating its own beacon 120, then the node 110a may determine whether to indicate the existence of congestion in the congestion variable 125 of its beacon 120. The determination of whether to indicate the existence of congestion in the congestion variable 125 may be based in part on whether the network 100 is currently congested as determined by the node 110a. Some implementations of the invention seek to avoid quick swings in advertisements of congestion by way of the congestion variable 125. For instance, it may be undesirable to indicate congestion when a node 110a has ten messages in its outgoing-message queue and then indicate a lack of congestion when the node 110a has nine messages shortly thereafter, leading to a back and forth swing between indications of congestion and no congestion. Thus, in some cases, even if the node 110a determines that congestion does not currently exist (e.g., based on the message queue), the node 110a may still indicate congestion in the congestion variable 125 to avoid such a quick swing. Analogously, in some cases, even if the node 110a determines that congestion currently exists, the node 110a may still allow the congestion variable 125 to indicate a lack of congestion.

Generally, whether to indicate the existence of congestion is based on one or more of the following: the current determination of the congestion state and the history of the determination of the congestion state (e.g., the prior congestion state and how long the current congestion state has existed). More specifically, to determine whether to indicate the existence of congestion in the congestion variable 125, the node 110*a* may determine whether the timer variable meets a threshold time (i.e., whether a time of at least the threshold time has passed at the current state of congestion). If the timer variable meets (e.g., equals or exceed) the timer threshold, and if the node 110*a* deems the network 100 to be currently congested, then the node 110*a* may decide to update the congestion variable 125 to indicate the existence of congestion. If the timer variable meets the timer threshold, and if the node 110*a* deems the network 100 to be currently not congested, then the node 110*a* may decide to leave the congestion variable 125 as is, without the node 110*a* indicating the existence of congestion. However, if the time passed since the last change in the congestion state does not meet the threshold time, then the node 110*a* may update the congestion variable 125 to indicate the existence of congestion only if the node 110*a* determines that the network is currently not congested. In this case, the network 100 only recently became uncongested as determined by the node 110*a*, and thus, the node 110*a* may continue to indicate that congestion exists to avoid a quick swing in indications. Thus, even if the node 110*a* deems the network 100 not to be congested, the node 110*a* may still update the congestion variable 125 to indicate the existence of congestion in some cases.

If the node 110*a* decides to update the congestion variable 125 to indicate the existence of congestion, then at block 335, the node 110*a* updates the congestion variable 125 accordingly. However, if the node 110*a* decides not to update the congestion variable 125, then the node skips block 335 and proceeds to block 340.

At block 340, the node 110*a* transmits the beacon 120 to its child nodes 110*a* as well as any other listening nodes 110, such as by broadcasting the beacon 120 over a radio. In some implementations, however, the node 110*a* generates its own beacon 120 rather than forwarding a received beacon 120. In either case, however, the beacon 120 transmitted may include the congestion variable 125. Thus, the node 110*a* may pass along its determination of whether congestion exists, moderated to avoid quick swings in such indication. Further, if an upstream node 110*a* of the node 110*a* indicated the existence on congestion, then that indication may be passed along in the beacon 120.

Figure 4:
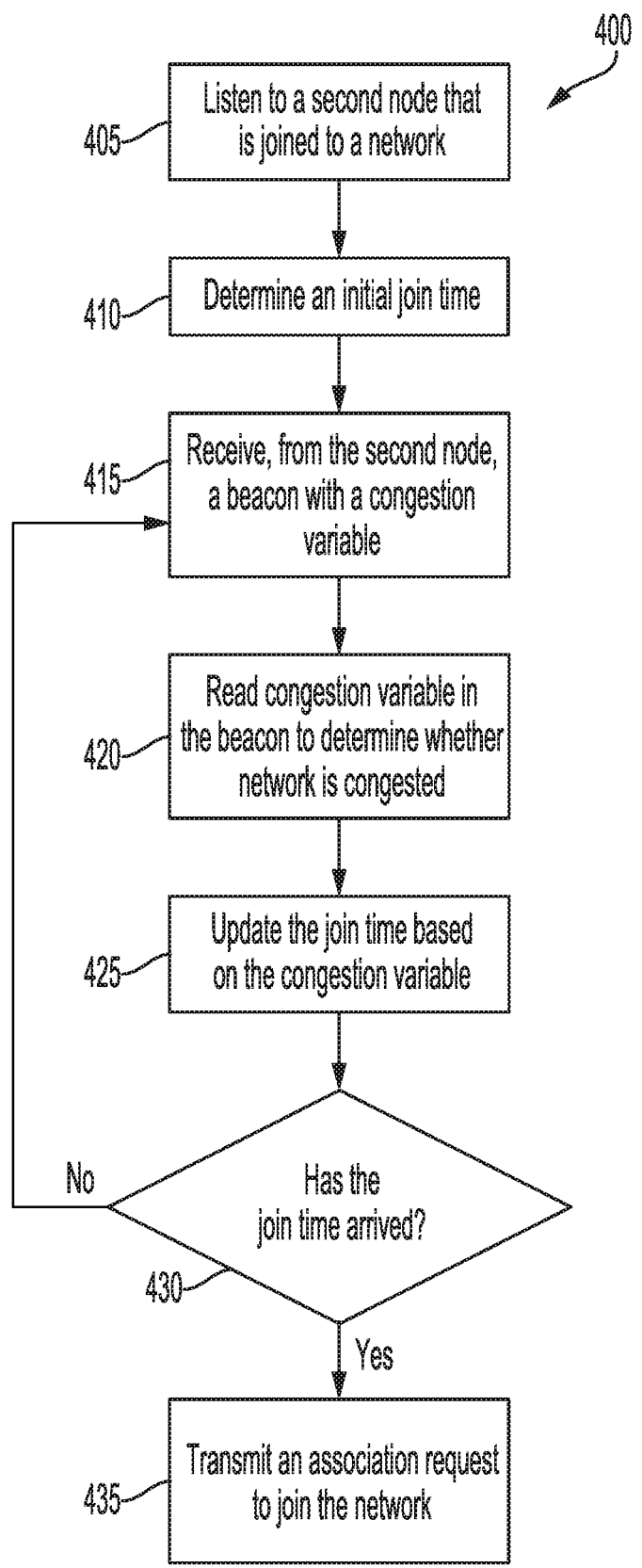
FIG. 4 is a flow diagram of a method of joining the network based on the indication of congestion in the beacon, according to some implementations of the invention.

FIG. 4 is a flow diagram of a method 400 of joining the network 100 based on the indication of congestion in the beacon 120, according to some implementations of the invention. Using this method 400 or similar, a joining node 110*b* seeking to join a network 100 may receive an advertisement indicating congestion in the network 100, where that advertisement is in the form of the congestion variable 125 in the beacon 120. Based on the indication of congestion, the joining node 110*b* may adjust its randomized join time 130, making it larger (i.e., later) or smaller (i.e., sooner), to adapt to network conditions.

As shown in FIG. 4, at block 405, a joining node 110*b* listens to a second node 110*a* that is already joined to a network 100 that the joining node 110*b* seeks to join. Various mechanisms known in the art may be used by the joining node 110*b* to select the second node 110*a* from among the various nodes 110*a* in the network 100.

At block 410, the joining node 110*b* determines a join time 130, which is a time at which the joining node 110*b* will send an association request 140 to join the network 100. In some implementations, for instance, the joining node 110*b* determines the join time 130 through random selection of a time within a join window, where the join window is a span of time extending for a predetermined length, such as fifteen minutes, for example. The join window may begin at a time representing the beginning of the joining node's attempt to join the network 100. For example, and not by way of limitation, the join window may begin when the joining node 110*b* begins listening to the second node 110*a* or when the join time 130 is about to be selected. Generally, the join window enables the join time 130 to be limited to a certain timeframe, specifically, the timeframe of the join window, and the randomization of the join time 130 within the join window spreads out the join times 130 of multiple joining nodes 110*b*. For instance, multiple nodes 110 may seek to join a network 100 at the same time, especially during network formation. Even if these multiple nodes 110 have the same or similar join windows, due to seeking to join the network 100 at the same or a similar time and utilizing the same predetermined join-window length, the use of randomized join times 130 spreads out the respective join times 130 of the multiple nodes 110.

In some implementations, the beginning of the join window for the joining node 110*b* is fixed. However, the length of the join window may be dynamic based on network congestion as described herein. The join time 130 determined at block 410 may be an initial join time 130, which may change based on network congestion.

At block 415, the joining node 110*b* receives, from the second node 110*a*, a beacon 120 having a congestion variable 125 embedded. As described above with respect to the method 300 of FIG. 3, the congestion variable 125 in the beacon 120 may indicate a level of congestion in the network 100. In some implementations, the second node 110*a* is performing the method 300 of FIG. 3, or similar, to update or pass on the value in the congestion variable 125 as needed.

At block 420, the joining node 110*b* reads the congestion variable 125 to identify whether the network 100 is congested according to one or more upstream nodes 110. Specifically, for instance, if the congestion variable 125 is set (e.g., has a value of one or another value indicating that congestion exists), then the joining node 110*b* may identify that the network 100 is congested according to the upstream nodes 110, and if the congestion variable 125 is not set (e.g., has a value of zero of another value indicating congestion does not exist), then the joining node 110*b* may identify that the network 100 is not congested according to the upstream nodes 110.

At block 425, the joining node 110*b* updates the join time 130 by adjusting the join time 130 based in part on the congestion variable 125. For instance, if the congestion variable 125 indicates the existence of congestion, then the join time 130 may be increased (i.e., delayed), and if the congestion variable 125 indicates a lack of congestion, then the join time 130 may be decreased (i.e., moved sooner). The updated join time 130, after the adjustment, may be based on one or more of the following, for example: the join time 130 as currently set, the congestion variable 125, the passage of time since the congestion variable 125 last changed as observed by the joining node 110*b*, and the number of failed attempts, if any, the joining node 110*b* has already made in trying to join the network 100. If the join time 130 is being adjusted based on the first beacon 120 and first congestion variable 125 read by the joining node 110*b*, then the passage of time may be set to zero or simply not considered.

Various mechanisms may be used to adjust the join time 130. For example, and not by way of limitation, the join time 130, J, may be adjusted upward toward a maximum join time, $J_M$, if the network 100 is deemed congested, and the join time 130 may be adjusted toward a minimum join time, $J_m$, if the network 100 is deemed not congested. The decision to adjust may be further based on the passage of time since the joining node 110b observed a different congestion state in the network 100 (i.e., received a beacon 120 with a different value in the congestion variable 125). For instance, the adjusted join time, $J_2$, may be calculated based on the existing join time, $J_1$; the passage of time (e.g., in seconds), t, since the joining node 110b observed a different value in a congestion variable 125; and the congestion variable, C, as follows:

if $C=0$ & $t>t_{min}$, then $J_2=\alpha J_1+\beta J_M$ if $C=1$ & $t>t_{min}$, then $J_2=\alpha J_1+\beta J_m$ else $J_2=J_1$ In the above, both $J_1$ and $J_2$ are expressed as time since the beginning of the join window. Further, in the above, the minimum join time, $J_m$, may be zero in some implementations, in which case the minimum join time is the beginning of the join window. The scalars $\alpha$ and $\beta$ may be tuning factors such that $\alpha+\beta=1$, where these tuning factors determine how aggressively the join time 130 is increased or decreased after the threshold time is met.

It will be understood that this particular mechanism to update the join time 130 is provided for illustrative purposes only. It will be further understood that if values other than zero and one are being used for the congestion variable 125, then the above formulas may be modified accordingly. For instance, in "C=0" of the above formula, the value of zero may be replaced by whatever value indicates a lack of congestion, and in "C=1," the value of one may be replaced by whatever value indicates the existence of congestion.

At decision block 430, the joining node 110b determines whether the join time 130 has arrived or, more specifically, whether the current time equals or exceeds the join time 130, as adjusted. If the join time 130 has not arrived, then the method 400 returns to block 415 to await additional beacons 120 from the second node 110a. If the join time 130 has arrived, however, then at block 435, the joining node 110b transmits to the second node 110a an association request 140 to join the network 100. If the join time 130 is ever updated to a time in the past, then similarly, the joining node 110b may proceed to transmit the association request 140. In other words, when the current time is at least the join time 130, then the joining node 110b may transmit the association request 140. Following the association request 140, the joining node 110b and the second node 110a may exchange one or more additional message to incorporate the joining node 110b into the network 100.

It will be understood that, although decision block 430 appears after block 425, some implementations of the joining node 110b periodically check whether the join time 130 has arrived throughout the method 400, rather than checking only after adjusting the join time 130. When the joining node 110b determines that the join time 130 has arrived, the joining node 110b may transmit the association request 140.

Thus, as described herein, in some implementations, each node 110 joined to the network 100 advertises congestion in the network, where such advertisements may be regulated to avoid quick swings back and forth between indications of congestion and the lack thereof. Further, each node 110 seeking to join the network 100 listens to a potential parent node 110 for the beacon 120, which includes an indication of congestion. Based on that indication of congestion, each such node 110 dynamically updates its join time 130 to cause the join times 130 of various nodes 110 to remain randomized but to further spread out or compress together based on the indications of congestion received.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

The features discussed herein are not limited to any particular hardware architecture or configuration. A computing device can include any suitable arrangement of components that provide a result conditioned on one or more inputs. Suitable computing devices include multipurpose microprocessor-based computer systems accessing stored software (i.e., computer-readable instructions stored on a memory of the computer system) that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied; for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation and does not preclude inclusion of such modifications, variations, and/or additions to the present subject matter as would be readily apparent to one of ordinary skill in the art.

What is claimed is:

1. A method for facilitating network joining, the method comprising:
   listening, by a joined node in a network, to a parent node in the network;
   receiving from the parent node a beacon indicating time synchronization of the network, the beacon further comprising a congestion variable indicating no congestion in the network;
   detecting local congestion in the network;
   updating the congestion variable to indicate that congestion exists in the network, based on the local congestion in the network;

transmitting a first beacon comprising the updated congestion variable to one or more other nodes listening to the joined node;
detecting a lack of local congestion in the network; and
updating the congestion variable in a second beacon to indicate that congestion no longer exists in the network, based on the lack of local congestion in the network and further based on based on a passage of time since the local congested was detected being less than a threshold time; and
transmitting the second beacon to the one or more other nodes listening to the joined node.

2. The method of claim 1, further comprising:
detecting a change from local congestion to a lack of local congestion; and
opting not to update the congestion variable in a third beacon to indicate that congestion no longer exists in the network, based on a passage of time since local congestion was detected.

3. The method of claim 1, further comprising:
detecting a change from a lack of local congestion to local congestion; and
opting not to update the congestion variable in a third beacon to indicate that congestion now exists in the network, based on a passage of time since the lack of local congestion was detected.

4. The method of claim 1, wherein detecting local congestion in the network comprises determining that an outgoing message queue meets a threshold quantity of outgoing messages.

5. The method of claim 1, wherein detecting local congestion in the network comprises determining that a packet success rate fails to meet a threshold packet success rate.

6. The method of claim 1, wherein the beacon comprising the congestion variable is received as a message in a data link layer of communication.

7. The method of claim 6, wherein the beacon comprising the congestion variable is received as a message in a Medium Access Control (MAC) sublayer of the data link layer.

8. The method of claim 6, wherein the congestion variable is represented as one or more bits in a header of the beacon.

9. The method of claim 1, wherein the joined node is a utility meter.

10. A system comprising:
a joined node configured to perform operations comprising:
receiving, from a parent node in a network, a beacon indicating time synchronization of the network, the beacon comprising a congestion variable indicating that congestion exists in the network;
detecting a lack of local congestion in in the network;
opting not to update the congestion variable to indicate that congestion no longer exists in the network, based on a passage of time since the joined node last detected local congestion; and
transmitting a first beacon comprising the congestion variable to one or more other nodes listening to the joined node; and
a joining node not yet joined to the network and configured to perform additional operations comprising:
listening to the joined node;
determining a join time at which to request to join the network;
receiving from the joined node the first beacon indicating time synchronization of the network, the first beacon further comprising the congestion variable indicating that congestion exists in the network;
increasing the join time based on the congestion variable; and
transmitting, at the join time, to the joined node an association request to join the network.

11. The system of claim 10, wherein the beacon comprising the congestion variable is received as a message in a Medium Access Control (MAC) sublayer of a data link layer of communication.

12. The system of claim 10, the additional operations performed by the joining node further comprising decreasing the join time based on at least one of (a) a second congestion variable in a second beacon indicating a lack of congestion and (b) a passage of time since the congestion variable indicated that congestion exists.

13. The system of claim 10, the additional operations performed by the joining node further comprising:
receiving, by the joining node, a second beacon comprising a second congestion variable indicating a lack of congestion in the network; and
decreasing the join time based on the second congestion variable indicating the lack of congestion.

14. The system of claim 13, wherein decreasing the join time is further based on a passage of time since the congestion variable indicated that congestion exists.

15. The system of claim 10, wherein the joining node is a utility meter.

16. A joined node comprising:
a processor configured to execute computer-readable instructions;
a memory configured to store the computer-readable instructions that, when executed by the processor, cause the processor to perform operations comprising:
listening to a parent node in a network, wherein the joined node shares the network with the parent node;
receiving from the parent node a beacon indicating time synchronization of the network, the beacon further comprising a congestion variable indicating no congestion in the network;
determining that a message queue meets a threshold quantity of outgoing messages;
updating the congestion variable in the beacon to indicate that congestion exists in the network, based on the message queue meeting the threshold quantity of outgoing messages;
transmitting the beacon comprising the congestion variable, as updated, to one or more other nodes listening to the joined node;
determining that the message queue no longer meets the threshold quantity of outgoing messages; and
updating the congestion variable in an additional beacon to indicate that congestion no longer exists in the network, based on the message queue no longer meeting the threshold quantity of outgoing messages and further based on a passage of time since the message queue met the threshold quantity being less than a threshold time.

17. The joined node of claim 16, wherein transmitting the beacon comprising the congestion variable comprises transmitting the beacon in a data link layer of communication.

18. The joined node of claim 17, wherein transmitting the beacon comprising the congestion variable comprises transmitting the beacon in a Medium Access Control (MAC) sublayer of the data link layer.

19. The joined node of claim 16, the operations further comprising:

determining that the message queue no longer meets the threshold quantity of outgoing messages; and opting not to update the congestion variable in another beacon to indicate that congestion no longer exists in the network, based on a passage of time since the message queue met the threshold quantity of outgoing messages.

20. The system of claim 10, wherein the joined node is a utility meter.

\* \* \* \* \*